(12) United States Patent
Anderson et al.

(10) Patent No.: US 9,754,012 B2
(45) Date of Patent: *Sep. 5, 2017

(54) EFFICIENT STORAGE OF DATA ALLOWING FOR MULTIPLE LEVEL GRANULARITY RETRIEVAL

(71) Applicant: TRANE U.S. INC., Piscataway, NJ (US)

(72) Inventors: Darrell Anderson, Palo Alto, CA (US); David Brock, Mountain View, CA (US)

(73) Assignee: TRANE U.S. INC., Davidson, NC (US)

(*) Notice: Subject to any disclaimer, the term of this patent is extended or adjusted under 35 U.S.C. 154(b) by 348 days.

This patent is subject to a terminal disclaimer.

(21) Appl. No.: 14/537,469

(22) Filed: Nov. 10, 2014

(65) Prior Publication Data

US 2015/0066937 A1 Mar. 5, 2015

Related U.S. Application Data

(63) Continuation of application No. 12/372,733, filed on Feb. 17, 2009, now Pat. No. 8,886,689.

(51) Int. Cl.
*G06F 17/30* (2006.01)
*G05B 23/02* (2006.01)

(52) U.S. Cl.
CPC .. *G06F 17/30598* (2013.01); *G06F 17/30548* (2013.01); *G06F 17/30551* (2013.01); *G05B 23/0264* (2013.01)

(58) Field of Classification Search
CPC ............... G06F 17/30548; G06F 17/18; G06F 17/30598; G06F 17/30551
USPC .................. 707/812, 748, 737, 758, 776
See application file for complete search history.

(56) References Cited

U.S. PATENT DOCUMENTS

| | | | |
|---|---|---|---|
| 6,593,862 B1 | 7/2003 | Wong et al. | |
| 6,609,085 B1* | 8/2003 | Uemura | G05B 19/418 702/113 |
| 6,983,227 B1 | 1/2006 | Thalhammer-Reyero | |
| 7,433,527 B2* | 10/2008 | Takayama | H03M 7/30 341/50 |
| 7,505,876 B2 | 3/2009 | Papadimitriou et al. | |
| 7,529,790 B1 | 5/2009 | Sayal | |
| 7,774,165 B2 | 8/2010 | Renner | |
| 7,783,679 B2* | 8/2010 | Bley | G06F 17/30548 707/809 |

(Continued)

*Primary Examiner* — Dangelino Gortayo
(74) *Attorney, Agent, or Firm* — Hamre, Schumann, Mueller & Larson, P.C.

(57) ABSTRACT

Data series are stored at multiple resolutions in a computer-readable data storage medium. In particular, time series data values of the data series are received with associated timestamps. Corresponding storage elements in the computer-readable data storage medium are identified based on the time stamps. Aggregate values are determined by summing the time series data values. The time series data values stored in the corresponding storage elements are replaced by the aggregate values. Combined data values of the aggregate values are stored in storage elements in the computer-readable storage medium at a first resolution and second resolution, where the second resolution is half of the first resolution.

8 Claims, 11 Drawing Sheets

(56) References Cited

U.S. PATENT DOCUMENTS

| | | | |
|---|---|---|---|
| 7,809,781 B1* | 10/2010 | Shan | G06F 17/18 708/200 |
| 7,860,969 B2 | 12/2010 | McCullough | |
| 7,924,884 B2 | 4/2011 | Kailash et al. | |
| 7,930,280 B2 | 4/2011 | Zaifman et al. | |
| 7,952,485 B2 | 5/2011 | Schechter et al. | |
| 8,169,481 B2 | 5/2012 | Ozdemir et al. | |
| 8,171,033 B2* | 5/2012 | Marvasti | G06F 17/18 702/160 |
| 8,296,408 B2 | 10/2012 | Anke et al. | |
| 9,245,000 B2* | 1/2016 | Marvasti | G06K 9/0053 |
| 2007/0027656 A1 | 2/2007 | Baraniuk et al. | |
| 2008/0256099 A1* | 10/2008 | Chodorov | G06Q 10/10 707/999.1 |
| 2009/0204951 A1 | 8/2009 | Laurenti et al. | |

* cited by examiner

FIG. 1

| 7 204 | 8 213 | 1 205 | 11 219 | 1 206 | 3 214 | 2 207 | 40 223 | 5 208 | 8 215 | 3 209 | 29 220 | 8 210 | 21 216 | 13 211 |

| 500 → 502 | 40 523 | 11 519 | 29 520 | 8 513 | 3 514 | 8 515 | 21 516 | 7 504 | 1 505 | 1 506 | 2 507 | 5 508 | 3 509 | 8 510 | 13 511 |

EFFICIENT STORAGE OF DATA ALLOWING FOR MULTIPLE LEVEL GRANULARITY RETRIEVAL

BACKGROUND

1. Field

The present application relates generally to storing and retrieving data, and more particularly, to storing time series data to allow data retrieval at multiple levels of granularity.

2. Related Art

Currently, time series data (sequential data from a common source with associated timestamps) is stored as a collection of data points with associated timestamps. To access the time series data over a given period of time, the set of data points must be retrieved from storage, organized, and processed. This requires a lot of time and resources for large data sets over large periods of time.

For example, some homes contain sensors to measure the amount of electricity consumed by the various appliances in the building. These sensors may be programmed to take measurements periodically and may send the measurement data to a computer for processing and storage. Traditionally, these measurements have been stored as individual readings in the computer's memory. Over long periods of time, the amount of data stored becomes considerably large. As a result, the amount of time required to retrieve the data from storage and process it also becomes very large. For instance, assuming that a single sensor is programmed to take a measurement every 2 minutes, there will be approximately 262,800 readings generated over the span of a year. Therefore, in order to view the total amount of electricity measured by that single sensor over a year, 262,800 data entries must be identified, retrieved from memory, and added together. That number grows even larger with the addition of more sensors, an increase in the rate of measurements, and an increase in the viewing range of the data.

Thus, what is needed is an efficient way to store time series data to allow for data retrieval at multiple levels of granularity.

BRIEF SUMMARY

In one exemplary embodiment, data series are stored at multiple resolutions in a computer-readable data storage medium. In particular, time series data values of the data series are received with associated timestamps. Corresponding storage elements in the computer-readable data storage medium are identified based on the time stamps. Aggregate values are determined by summing the time series data values. The time series data values stored in the corresponding storage elements are replaced by the aggregate values. Combined data values of the aggregate values are stored in storage elements in the computer-readable storage medium at a first resolution and second resolution, where the second resolution is half of the first resolution.

DETAILED DESCRIPTION

The following description is presented to enable a person of ordinary skill in the art to make and use the various embodiments. Descriptions of specific devices, techniques, and applications are provided only as examples. Various modifications to the examples described herein will be readily apparent to those of ordinary skill in the art, and the general principles defined herein may be applied to other examples and applications without departing from the spirit and scope of the various embodiments. Thus, the various embodiments are not intended to be limited to the examples described herein and shown, but is to be accorded the scope consistent with the claims.

Various embodiments are described below for storing time series data to allow data retrieval at multiple levels of granularity. As used herein, time series data refers to sequential data from a common source, such as a sensor, that contains an associated timestamp (metadata indicating the time the data was gathered). An example of time series data is the set of time stamped data values obtained from a temperature sensor programmed to take a temperature reading every 2 minutes. The examples provided herein demonstrate how data similar to these sensor readings may be stored in order to allow retrieval of the data at multiple levels of granularity.

Figure 1:
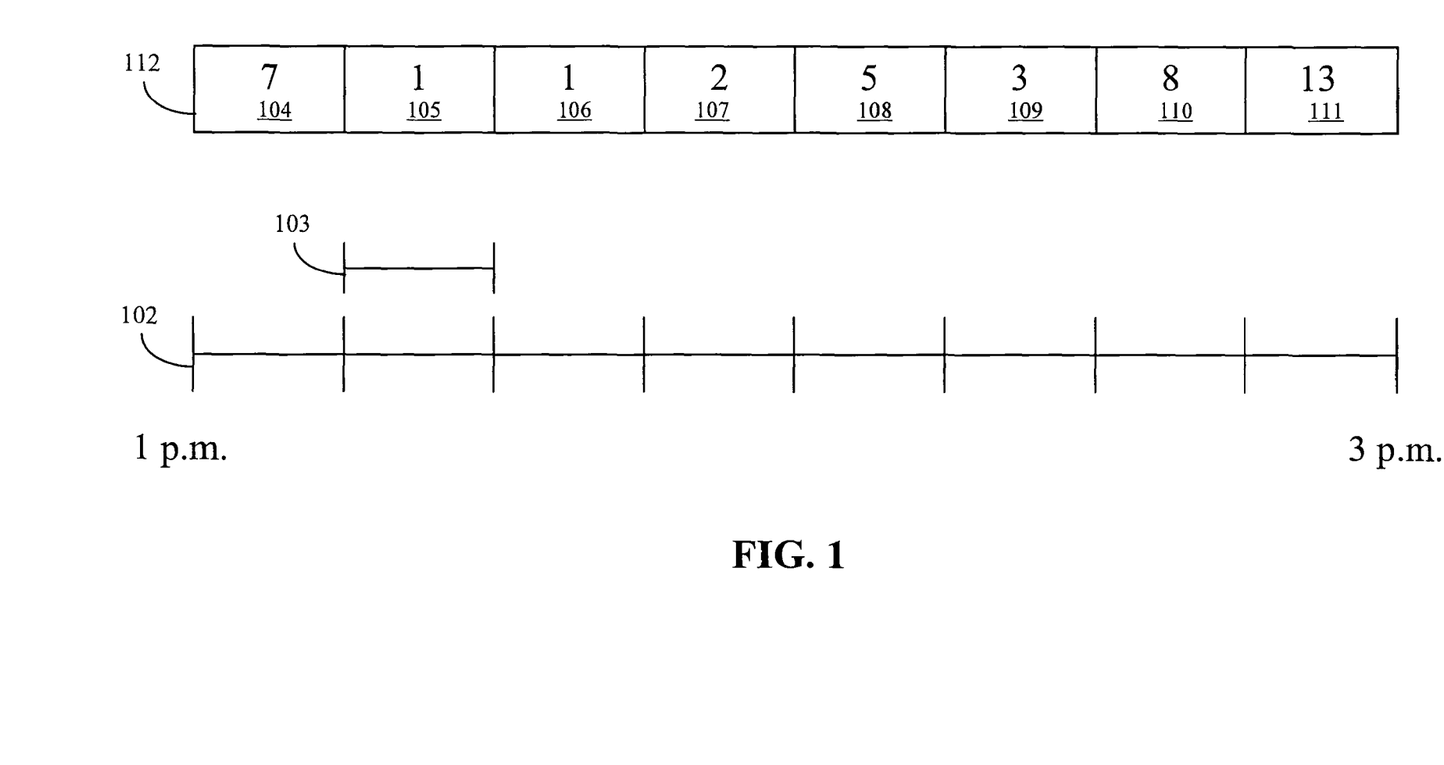
FIG. 1 illustrates a span of time divided into multiple segments.

According to one exemplary embodiment, a set of time series data may be organized into groups based on the associated timestamps corresponding to a particular segment of time. For example, FIG. 1 illustrates a span of time divided into multiple segments. Timeline 102 provides a visual representation of the 2 hour span of time from 1 p.m. to 3 p.m. and is shown divided into multiple segments. In the example illustrated by FIG. 1, each segment is of equal length and represents a 15 minute block of time. For example, segment 103 represents the segment of time from 1:15 p.m. to 1:30 p.m. It should be appreciated by one of ordinary skill in the art that the period of time may be divided into any number of segments of any length of time.

As stated above, the time series data may organized based on the associated timestamps corresponding to a segment of time. For instance, all data values having a time stamp falling within the range of time from 1:15 p.m. to 1:30 p.m. may be grouped together since they fall into the segment of time represented by segment 103.

In another example, the set of time series data may further be stored at multiple resolutions, for instance, the data may be stored at a high resolution (e.g., storing the data in small segments of time), at a low resolution (e.g., storing the data in large segments of time), or an intermediate resolution. For example, rainfall measurements taken each day for a month may be stored by day, by week, or by month. Storing the rainfall measurements by day represents a high resolution storing of the data, storing the rainfall measurements by week represents an intermediate resolution storing of the data, and storing the rainfall measurements by month represents a low resolution storing of the data.

Figure 2:
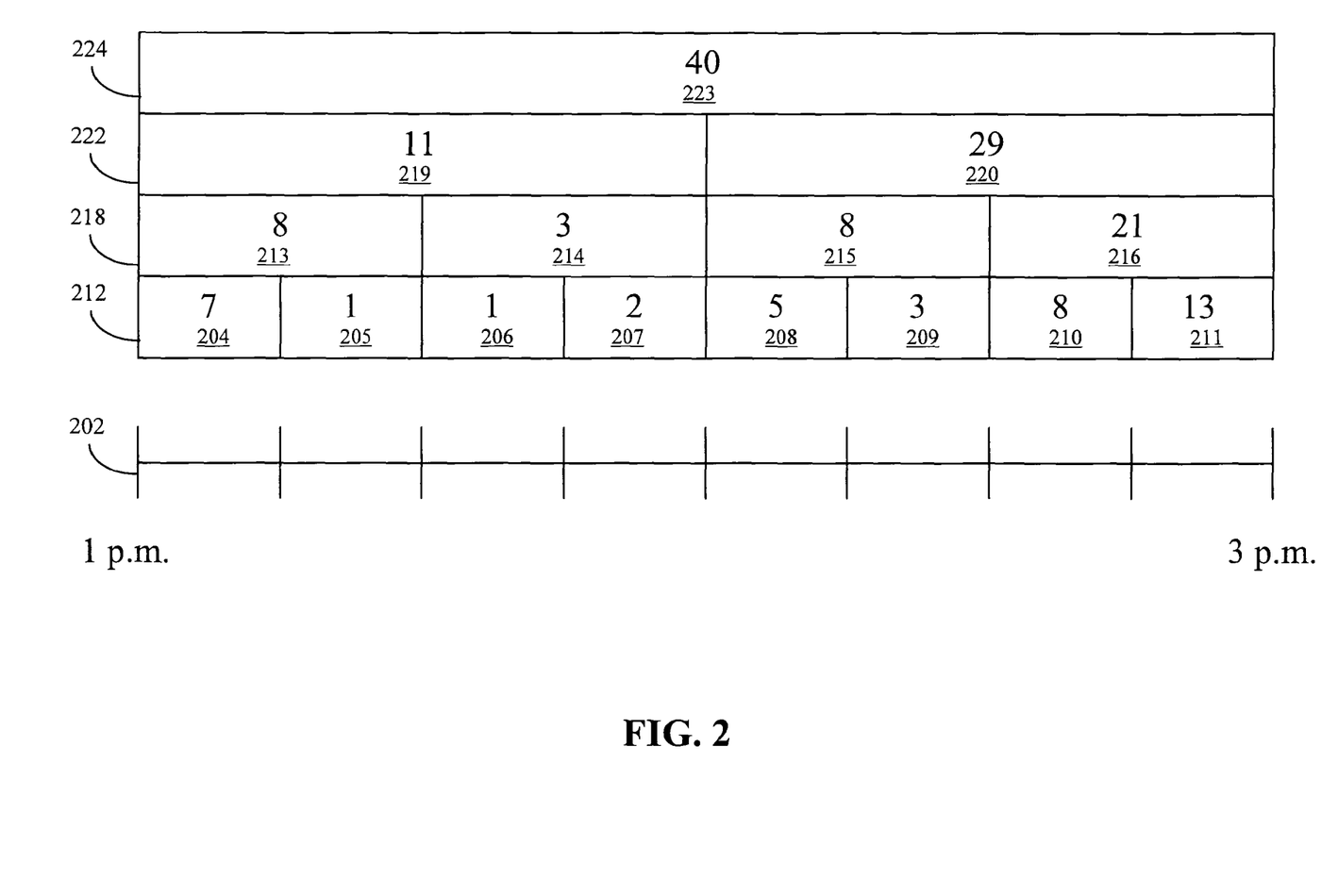
FIG. 2 illustrates an exemplary representation of time series data at varying resolutions.

FIG. 2 illustrates a visual representation of time series data at varying resolutions. Timeline 202 is shown at the bottom of the figure to provide a time reference for the segments illustrated above. FIG. 2 includes row 212, which represents the highest resolution storage of data in the illustrated example. Row 212 includes segments 204-211. In the example illustrated by FIG. 2, each segment of row 212 is of equal length and represents a 15 minute segment of time. For example, segment 208 represents the segment of time from 2:00-2:15 p.m. Thus, any time series data that has an associated timestamp with a time between 2:00-2:15 p.m. may be grouped and stored together. In one example, grouping time series data may include adding the values together to form a single number. This single number may then be associated with segment 208. In the example illustrated by FIG. 2, the value 5 is associated with segment 208. In this example, the sum of all the time series data values received with an associated timestamp between 2:00-2:15 p.m. is equal to 5.

Row 218 represents a lower resolution view of the time series data. Row 218 includes segments 213-216. Each segment in row 218 is equal to 2 segments of the next higher resolution row (row 212). For example, segment 215 represents the sum of segments 208 and 209. This means that segment 215 represents both the sum of the values associated with segments 208-209 as well as the sum of the time represented by segments 208-209. Thus, the value associated with segment 215 is equal to 8 (the sum of the values stored in segments 208-209) and the span of time represented by segment 215 is 2:00 p.m. to 2:30 p.m. (the segment of time represented by segments 208-209). It should be appreciated by one of ordinary skill in the art that the lower resolution level may be comprised of any number of higher resolution segments. For instance, instead of representing 2 higher-resolution segments, the segments of row 218 may represent 3 segments of row 212.

Row 222 represents a lower resolution view of the time series data than both rows 212 and 218. Row 222 includes segments 219 and 220. Each segment of row 222 is equal to 2 segments of row 218 and 4 segments of row 212. For example, segment 220 represents the sum of segments 215 and 216. This means that segment 220 represents both the sum of the values associated with segments 208-211 as well as the sum of the time represented by segments 208-211. Thus, the value associated with segment 220 is equal to 29 (the sum of the values stored in segments 215-216) and the span of time represented by segment 220 is 2:00 p.m. to 3:00 p.m. (the segment of time represented by segments 215-216).

Row 224 represents a lower resolution view of the time series data than do rows 212, 218, and 222. Row 224 includes segment 223. Each segment of row 224 is equal to 2 segments of row 222, 4 segments of row 218, and 8 segments of row 212. For example, segment 223 represents the sum of segments 219 and 220. Thus, the value associated with segment 223 is equal to 40 (the sum of the values stored in segments 219-220) and the span of time represented by segment 223 is 1:00 p.m. to 3:00 p.m. (the segment of time represented by segments 219-220).

Storing time series data in the format illustrated by FIG. 2 allows for efficient retrieval of data. For example, if a user requests time series data over the time period from 1:00 p.m. to 1:30 p.m., a processor may simply retrieve the data value associated with segment 219 from a database instead of having to retrieve and add the data values associated with segments 204-207. This saves time and processing resources at the time the data is requested.

In another example, the request received from a user may not exactly match one of the segments illustrated by FIG. 2. For example, a user may request data for the time period from 1:10 p.m.-1:30 p.m. Since no segment exactly covers the span of time requested, a weighted average of segments may be used to approximate the data over the requested period of time. Using the same example, the segment of time from 1:00 p.m.-1:15 p.m. is associated with the value 7 and the segment of time from 1:15 p.m.-1:30 p.m. is associated with the value 1. A weighted average algorithm adds together the result of multiplying each stored value by the percentage of the respective segment that is covered by the requested span of time. For example, the requested span of time from 1:10 p.m.-1:30 p.m. covers 100% of the segment of time from 1:15 p.m.-1:30 p.m. Additionally, the requested span of time from 1:10 p.m.-1:30 p.m. covers ⅓ of the segment of time from 1:00 p.m.-1:15 p.m. Thus, the weighted average approximation of the data from 1:10 p.m.-1:30 p.m. is $(1)*(7)+(⅓)*(1)=22/3$.

Figure 3:
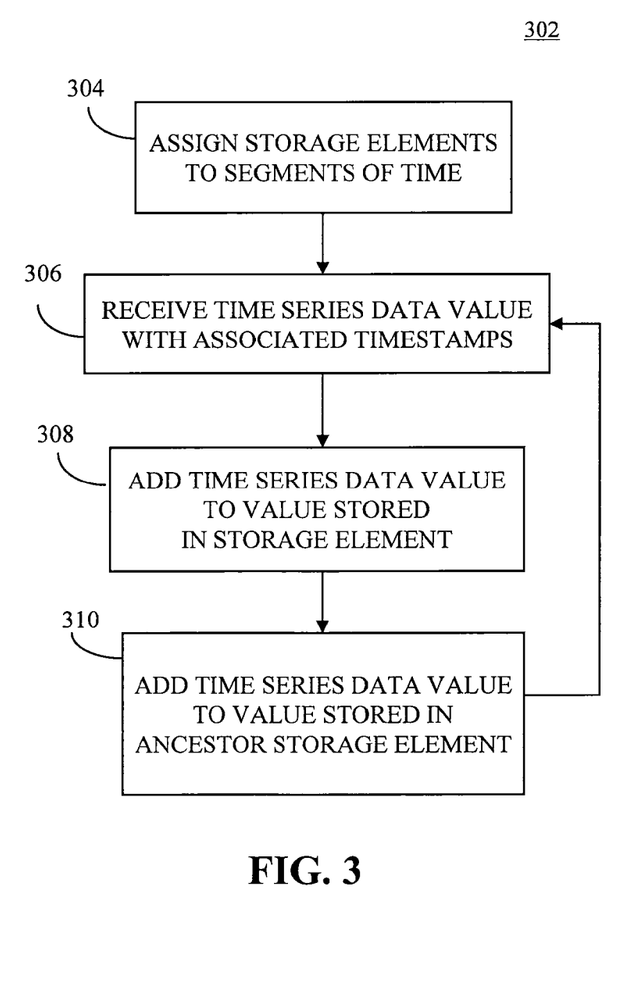
FIG. 3 illustrates an exemplary process for storing time series data.

FIG. 3 illustrates an exemplary process 302 for storing time series data according to the format described with respect to FIG. 2.

At block 304, the process includes assigning a different storage element of a data structure in a computer-readable data storage medium to each of the segments of time. The segments of time may be similar to the segments described with respect to FIG. 1. In one example, the storage element may be an element of an array. FIG. 1 illustrates an exemplary implementation of block 304 using an array. Array 112 is provided to illustrate how each index of the array (104-111) corresponds to each segment of time from timeline 102. For example, index 0 (104) of array 112 corresponds to the segment of time from 1:00 p.m.-1:15 p.m. Thus, index 0 of the array may store the sum of all time series data values received with an associated timestamp between 1:00 p.m.-1:15 p.m. While array 112 is shown with respect to a finite span of time, it should be appreciated that array 112 may be expanded as the span of time increases. For example, if array 112 is used to store time series data in real time, the number of segments of time will increase as time goes on. Consequently, the number of elements in the array must also increase to account for the additional segments of time.

An example of program code to implement the array described above is provided below:

```
1  chunk_size = 60 // divide time into 'chunk_size' second chunks
2  array = [ ]
3
4  INSERT(time, value):
5      index = time / chunk_size
6      array[index] += value
7
8  RANGESUM(start_time, end_time):
9      start_index = start_time / chunk_size
10     end_index = end_time / chunk_size
11     sum = 0
12     for index in range(start_index, end_index):
13         sum += array[index]
14     return sum
```

The array implementation described above assumes that there will be sufficient resources for an infinite array. However, in some situations only a fixed amount of data may be saved. This may occur when there is a finite amount of storage space for the time series data. In one example, data may be saved for a set amount of time before it is overwritten with new data. For instance, the time series data may be kept for 7 years. After 7 years, the oldest data entries may be overwritten with new data. In one example, a wrap-around array may be used to store data for a set amount of time before overwriting the oldest data entries. Processes for implementing a wrap-around array are well known by those of ordinary skill in the art.

An example of program code to implement such a data structure is provided below:

```
1  chunk_size = 60 // divide time into 'chunk_size' second chunks
2  history_size = 1000 // keep only 'history_size' chunks worth of data
3  last_virtual index = 0 // the last array index updated
4  array = [ ]
5
6  INSERT(time, value):
7      virtual_index = time / chunk_size
8
9      // The physical array wraps around. Clear old before adding new.
10     for clear_virtual_index in range(last_virtual_index + 1,
           virtual_index):
11         clear_physical_index = clear_virtual_index %
              history_size
12         array[clear_physical_index] = 0
13         last_virtual_index = virtual_index // assumes increasing
              timestamps
14
15     physical_index = virtual_index % history_size
16     array[physical_index] += value
17
18 RANGESUM(start_time, end_time):
19     start_virtual_index = start_time / chunk_size
20     end_virtual_index = end_time / chunk_size
21     sum = 0
22     for virtual_index in
           range(start_virtual_index, end_virtual_index):
23         physical_index = virtual_index % history_size
24         sum += array[physical_index]
25     return sum
```

In another example, a first set of additional storage elements may be provided and assigned to represent each pair of storage elements representing adjacent segments of time. This first set of additional storage elements represents a lower resolution storing of the data than the storage elements representing the segments of time.

For example, segments 213-216 of FIG. 2 represent a lower resolution storing of segments 204-211. In another example, a second set of additional storage elements may be provided and assigned to each pair of the first set of additional storage elements. This second set of additional storage elements represents a lower resolution storing of the data than the first set of additional storage elements. For example, segments 219-220 of FIG. 2 represent a lower resolution storing of segments 213-216. In one example, the storage elements may be organized similarly to the structure illustrated by FIG. 2. Additional sets of storage elements may be provided in a similar fashion until each pair of storage elements of the same row (e.g., 212, 218, 222, 224) is represented by another storage element (e.g., segments 219 and 220 are represented by segment 223).

One of ordinary skill in the art will appreciate that other data structures may be used to store the time series data. For example, a binary tree may be used to store data according to exemplary process 302. In this example, a different leaf of the binary tree is assigned to each segment of time.

Figure 4:
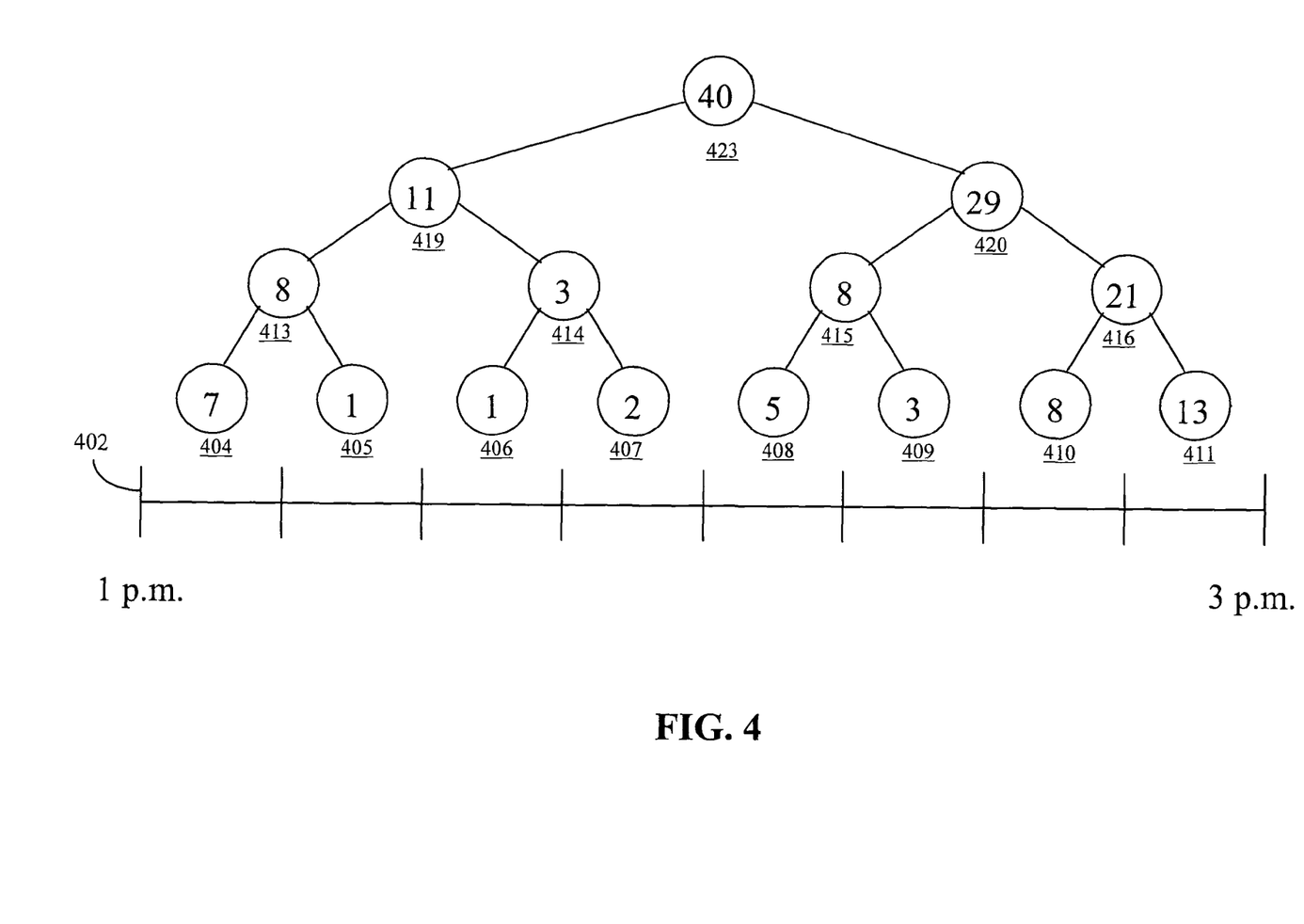
FIG. 4 illustrates an exemplary data structure that may be used by various embodiments.

FIG. 4 illustrates the data structure commonly known by those skilled in the art as a binary tree. Specifically, it is a perfect binary tree because each node has 2 children and each leaf of the tree resides on the same level. FIG. 4 includes timeline 402, which is shown at the bottom of the figure to provide a time reference for the nodes illustrated above. Nodes 404-411, 413-416, 419-420, and 423 correspond to segments 204-211, 213-216, 219-220, and 223 of FIG. 2, respectively. In one example, this data structure may be used to store time series data where each storage element represents 2 higher resolution storage elements.

In one example, a different leaf of the binary tree is assigned to each segment of time at block 304. For instance, where the span of time from 2 p.m. to 6 p.m. is divided into 16, 15-minute segments, 16 leaves of the binary tree may be assigned to the 16 segments of time. In one example, the leaf to the far left of the tree (e.g., node 404 of FIG. 4) is assigned to the first 15 minute segment (2:00 p.m.-2:15 p.m.), the leaf to the right of that is used to represent the second 15 minute segment (2:15 p.m.-2:30 p.m.), and the remaining leaves are assigned in a similar fashion until all of the segments have been assigned a leaf.

One of ordinary skill in the art will appreciate that the process described assumes a binary tree of infinite size that may accommodate any number of segments. However, it should be appreciated that in practice such a situation may not be possible. Thus, the process may implement a wrap-around feature where data is saved for a period of time before being overwritten by new data. In a binary tree implementation, the leaf assigned to the oldest segment may be cleared of all data and subsequently assigned to the newest segment.

Figure 5:
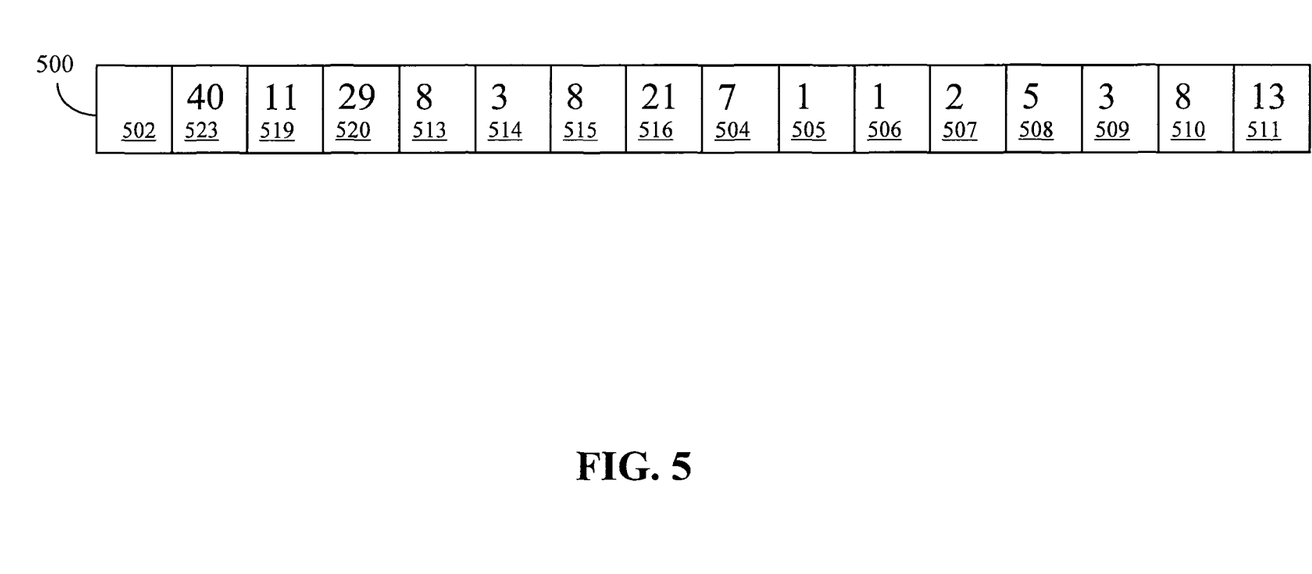
FIG. 5 illustrates an array implementation of the data structure of FIG. 4.

FIG. 5 illustrates an exemplary array implementation of the data structure of FIG. 4. Implementing a binary tree using an array is well known to those of ordinary skill in the art. FIG. 5 includes array 500, which is one example of an array used to implement the binary tree of FIG. 4. Array elements 504-511, 513-516, 519-520, and 523 correspond to segments 404-411, 413-416, 419-420, and 423 of FIG. 4, respectively. In one example, the array begins with the root node of the binary tree and is followed by the nodes of each lower level. In another example, array element 502 is left empty in order to start the index of the array at 1. This allows for easy identification of the index for parent and child nodes. For example, the index for the parent node of node X can be determined using the Floor(x/2) command, where x is the index of node X. The floor function returns the largest integer value that is less than the value contained in the parenthesis. Thus, if index of node X is 3, the parent node would be located at Floor(3/2), or index 1.

While array 500 is shown with respect to a finite span of time, it should be appreciated that array 500 may be expanded as the span of time increases. For example, if array 500 is used to store time series data in real time, the number of segments of time will increase as time goes on. Consequently, the number of nodes in the binary tree and thus the number of elements in the array must also increase to account for the additional segments of time.

The array implementation described above assumes that there will be sufficient resources for an infinite array. However, in some situations only a fixed amount of data may be saved. This may occur when there is a finite amount of storage space for the time series data. In one example, data may be saved for a set amount of time before it is overwritten with new data. For instance, the time series data may be kept for 5 years. After 5 years, the oldest data entries may be overwritten with new data. In one example, a wrap-around array implementation of a binary tree may be used to store data for a period of time before overwriting the oldest values. Processes for implementing a wrap-around array implementation of a binary tree are well known by those of ordinary skill in the art.

An example of program code to implement the described array is provided below:

```
1  chunk_size = 60 // divide time into 'chunk_size' second chunks
2  history_size = 1024 // keep 'history_size' chunks worth of data, pow2!
3  tree_levels = log2(history_size)
4  last_virtual_leaf_index = 0 // the last leaf row index updated
5  array = [ ]
6
7  INSERT(time, value):
8      virtual_leaf_index = time / chunk_size
9
10     // The physical array wraps around. Clear old before adding new.
11     for clear_virtual_leaf_index in range(last_virtual_leaf_index +1, virtual_leaf_index):
12         clear_physical_leaf_index = history_size +(clear_virtual_leaf_index % history_size)
13         clear_value = array[clear_physical_leaf_index]
14         for level in range(0, tree_levels):
15             array[clear_physical_leaf_index >> level] -= clear_value
16     last_virtual_leaf_index = virtual_leaf_index // increasing timestamps
17
18     physical_array_index = history_size + (virtual_leaf_index % history_size)
19     for level in range(0, tree_levels):
20         array[physical_array_index >> level] += value
21
22 RANGESUM(start_time, end_time, level):
23     start_virtual_leaf_index = start_time / chunk_size
24     end_virtual_leaf_index = end_time / chunk_size
25     sum = 0
26     for virtual_leaf_index in range(start_virtual_leaf_index, end_virtual_leaf_index, 1 << level):
27         physical_leaf_index = history_size + (virtual_leaf_index %history_size)
28         sum += array[physical_index >> level]
29     return sum
```

With reference again to FIG. 3, at block 306, a time series data value with an associated timestamp is received. As previously stated, time series data refers to sequential data from a common source with associated timestamps. In one example, the time series data and associated timestamps may be received from a sensor. Alternatively, in another example, block 306 may include generating a timestamp based on the time the time series data value is received.

At block 308, the storage element corresponding to the received time series data value is identified based on the associated timestamp. The time series data value is then added to the value stored in the storage element corresponding to the received time series data value. For example, the span of time from 2 p.m. to 4 p.m. may be divided into 24, 5 minute segments. If a time series data value is received with a timestamp of 2:02 p.m., then it may be determined that the first segment of time (2 p.m.-2:05 p.m.) corresponds to the received time series data. The received data value may then be added to the value stored in the storage element associated with the identified segment of time. In one example, all of the values stored in each storage element may initially be set to zero. Thus, if the received time series data value is the first received for a particular segment, the value will be added to zero. However, if a time series data value has already been received for a particular segment, the storage element corresponding to the segment may contain a non-zero value. For instance, if a value has been received with a timestamp of 2:01 p.m., the storage element corresponding to the first segment may contain the value received at 2:01 p.m. prior to the addition of the value received with a timestamp of 2:02 p.m.

At block 310, the time series data is added to the value stored in the ancestor storage elements of the storage element corresponding to the received time series data value. An ancestor to a particular storage element is any storage element that encompasses the segment of time represented by the particular storage element. For example, referring to FIG. 4, node 419 is an ancestor to node 406 because the segment of time represented by node 419 (1:00 p.m.-2:00 p.m.) includes the segment of time represented by node 406 (1:30 p.m.-1:45 p.m.) Thus, at block 310, the received time series data value may be added to the additional storage elements, which represent a lower resolution storing of the segments. For example, referring to FIG. 4, a data value associated with node 404 may be added to nodes 413, 419, and 423 since they all include the segment of time represented by node 404. In one example, the process includes returning to block 306 after completion of block 310. This process may continue as more time series data is received.

For certain types of data, it may be desirable to display something other than sums of values. For example, the sum of multiple temperature readings taken over a time span would not be typically displayed. However, an average temperature over the time span would be desirable to display.

Figure 6A:
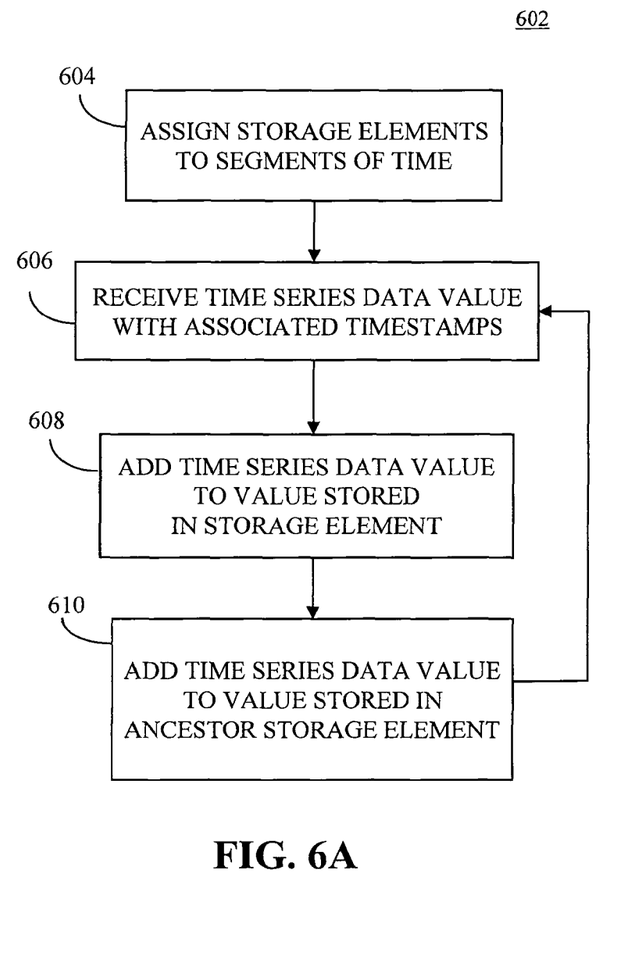
FIGS. 6A-C illustrate an exemplary process for storing averages of time series data.

Thus, FIG. 6A illustrates a portion 600 of an exemplary process for storing averages of time series data. The blocks of FIG. 6A are similar to those of FIG. 3 and are directed to the storing of time series data and their sums.

Figure 6B:
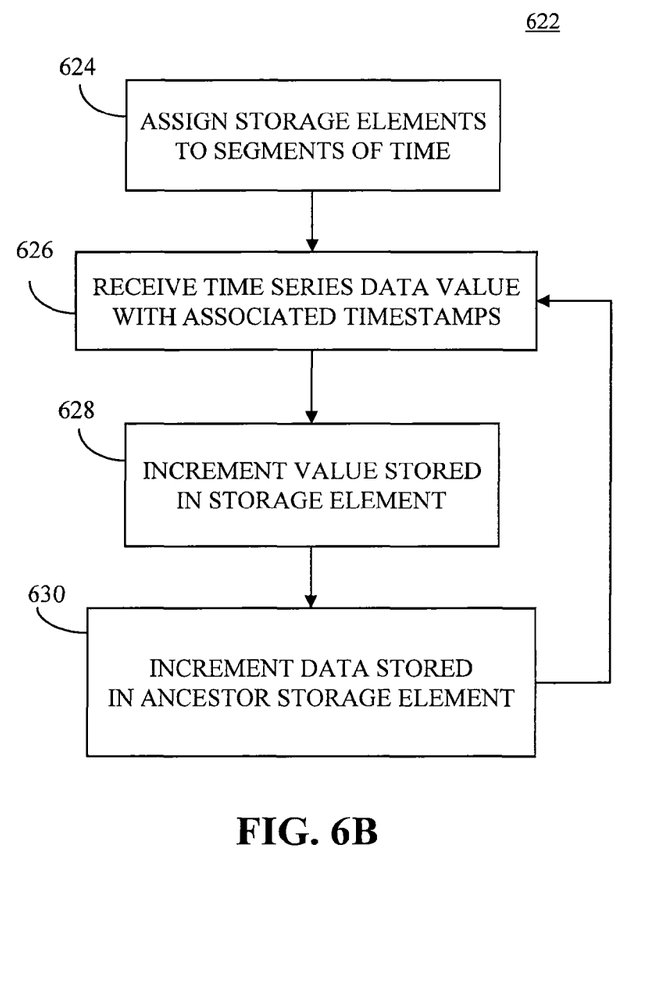

FIG. 6B illustrates a portion 622 of an exemplary process for storing averages of time series data. The data structure generated by FIG. 6B keeps track of the number of time series data values that have been added to the data structure generated by FIG. 6A. Blocks 624 and 626 are similar to blocks 304 and 306 of FIG. 3, respectively.

At block 628, the value stored in the storage element corresponding to the received time series data value is incremented by 1. In one example, the corresponding storage element is identified using the timestamp associated with the received time series data value. The process of identifying the corresponding storage element may be similar to that of block 308 of FIG. 3. Once the corresponding storage element is identified, the value stored in the storage element may be incremented by 1. In one example, the initial value stored in each storage element of the data structure generated at block 624 may be zero. In another example, the storage elements of the data structure of FIG. 6B may each map directly to a storage element of the data structure of FIG. 6A. This mapping may be determined by the storage elements representing the same segment of time. Thus, each time a time series data value is added to a storage element of the data structure of FIG. 6A, a value is incremented in a storage element of the data structure of FIG. 6B. The value stored in the storage elements of FIG. 6B act as a counter for the number of values added to the storage elements of the data structure of FIG. 6A.

At block 630, the data stored in each ancestor storage element of the storage element corresponding to the received data value is incremented by 1. The ancestor storage elements are similar to those described with respect to block 310 of FIG. 3. In one example, the process includes returning to block 626 after completion of block 630. This process may continue as more time series data is received.

Figure 6C:
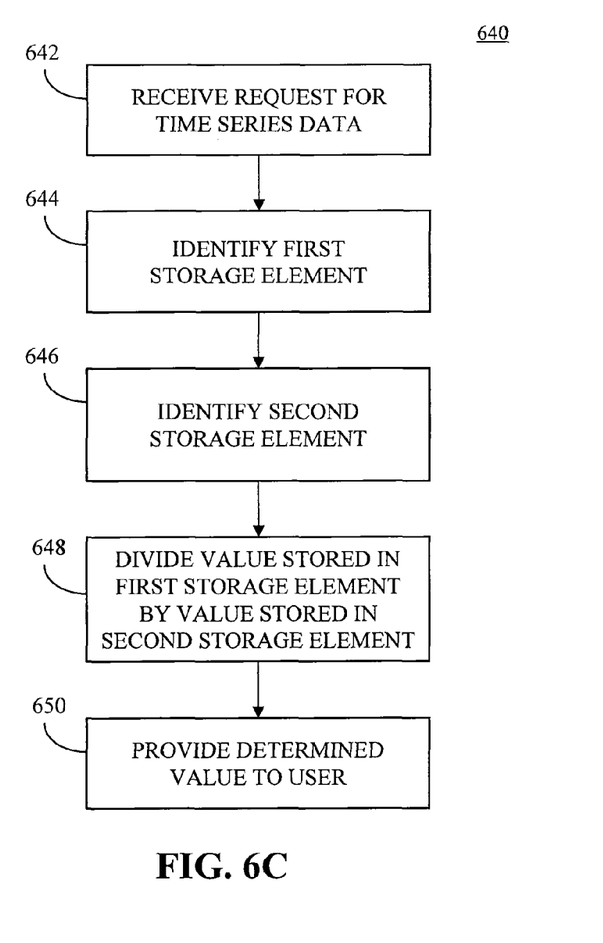

FIG. 6C illustrates a portion 640 of an exemplary process for storing averages of time series data. At block 642, a request for time series data over a selected range of time is received. For example, a request may be made for the water pressure readings from a particular sensor from 1:00-1:30 p.m. on a given day.

At block 644, a first storage element of the data structure generated at block 604 is identified based on the selected range of time. For example, a user may request data for the range of time from 1:00 p.m.-1:30 p.m. Thus, the process includes identifying the storage element of the data structure generated at block 604 that represents the range of time from 1:00 p.m.-1:30 p.m. For example, referring to FIG. 2, the storage element associated with segment 213 contains the requested information since segment 213 represents the range of time from 1:00 p.m.-1:30 p.m.

In another example, the selected range of time may not directly line up with the segments associated with the storage elements assigned at blocks 604 and 624. If such a request is received, then a weighted averages algorithm may be used. As described above, a weighted average algorithm adds together the products of multiplying each stored value by the percentage of time that the corresponding storage element represents.

At block 646, a second storage element of the data structure generated at block 624 is identified based on the selected range of time. Block 646 is similar to block 644.

At block 648, the value stored in the first storage element is divided by the value stored in the second storage element. This produces the average value over the selected range of time by dividing the total sum for the segment of time by the number of entries that the total sum represents.

At block 650, the value produced at block 648 is provided to the user requesting the information.

Figure 7:
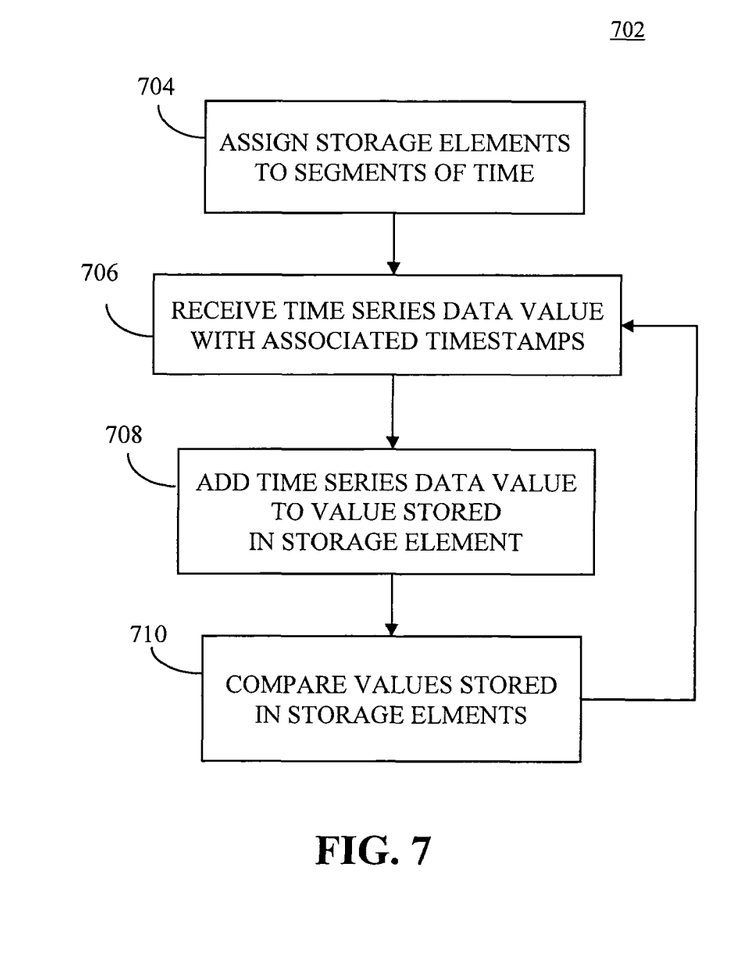
FIG. 7 illustrates an exemplary process for storing time series data and determining the largest value over a given period of time.

FIG. 7 illustrates an exemplary process 702 for determining the largest value stored in a data structure similar to the data structure illustrated by FIG. 4. Blocks 704, 706, 708 are similar to blocks 304, 306, and 308 of FIG. 3, respectively.

At block 710, the value stored in the storage element is compared with the value stored in the sibling storage element. The larger value is stored in the parent storage element. The sibling storage element refers to the storage element that shares a common lower-resolution storage element. For example, referring to FIG. 4, node 408 is a sibling of node 409 since it shares a common lower-resolution node 415. The parent storage element refers to the next lower-resolution storage element of the current storage element. For example, referring to FIG. 4, node 415 is the parent storage element of nodes 408 and 409 since it is the next lower resolution storage element of nodes 408 and 409. By comparing the values stored in sibling storage elements, the larger of the two may be stored in the parent storage element. This creates a data structure where each parent storage element is equal to the larger of its two children. When the value of the parent node is changed because of a change in the value of the children, the new value stored in the parent must then be compared to the sibling of the parent node. This process is repeated until the value in the parent does not change or the root storage element (the storage element representing all of the other storage elements) is reached.

In one example, a user may request the largest value over a certain period of time. The requested value may readily be determined by selecting the storage element, which represents the requested period of time. For example, a user may request the highest temperature over a 1 year period. The system may simply access the storage element associated with the 1 year period to obtain the largest value. This may be accomplished without retrieving and comparing every temperature reading received during that one year period.

Figure 8:
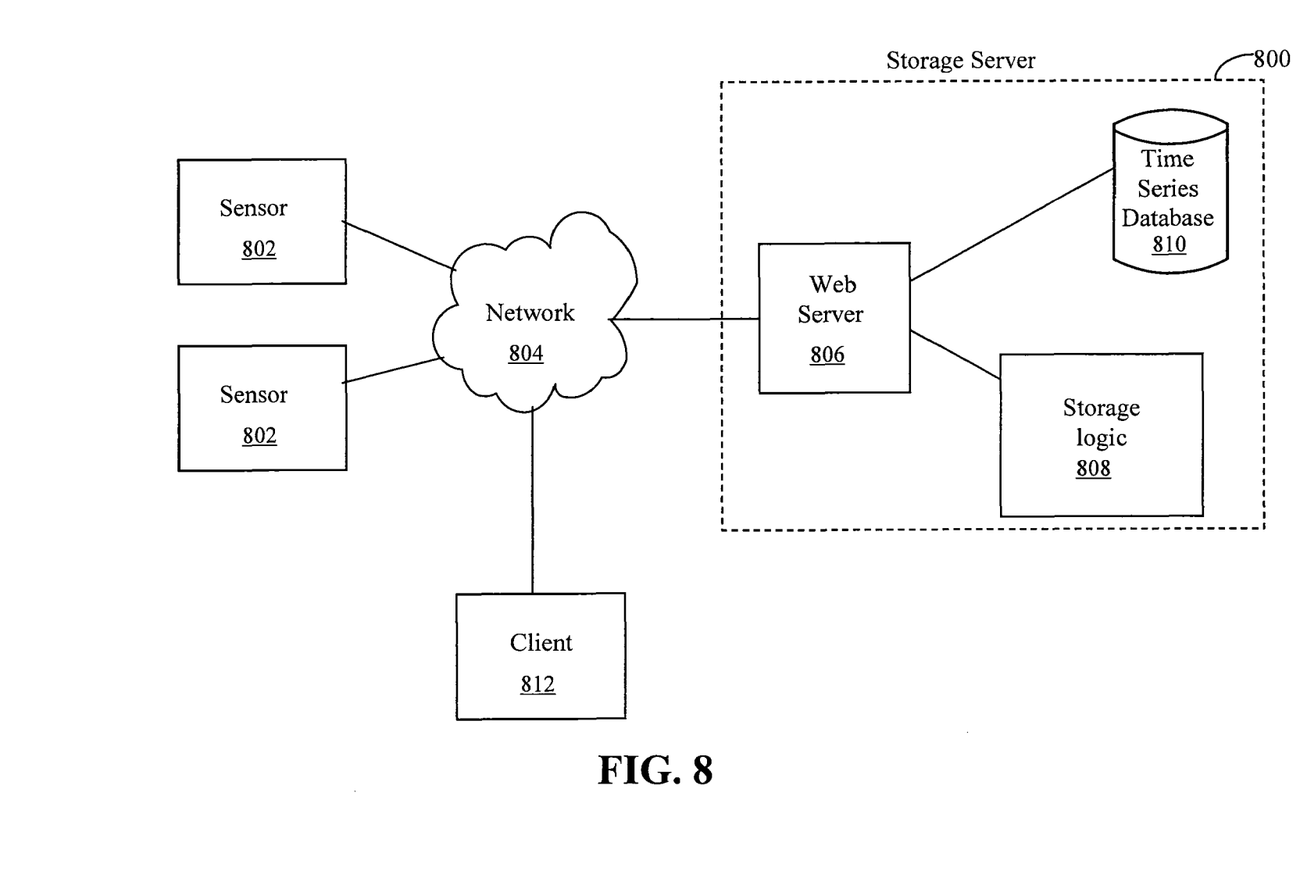
FIG. 8 illustrates a block diagram of an exemplary application in which time series data can be stored at multiple resolutions.

FIG. 8 illustrates a block diagram of an exemplary application in which time series data can be stored at multiple resolutions. Generally, sensors 802 may send data to storage server 800. In one example, the data sent from sensors 802 to server 800 may include time series data.

Sensors 802 may include gas meters, water meters, pressure sensors, temperature sensors, and the like. Sensors 802 may be further operable to generate a timestamp indicating the time at which a measurement was taken. Alternatively, storage server 800 may generate a timestamp based on the time a particular data value is received from sensors 802. While only 2 sensors 802 are shown, it should be understood that any number and any type of sensors 802 may be used. Storage server 800 may include web server 806 for interfacing with network 804. Web server 806 and sensors 802 may include any one of various types of computer devices having a processing unit, a memory (including a permanent storage device), and a communication interface, as well as other conventional computer components.

Sensors 802 and web server 806 may communicate, e.g., via suitable communication interfaces via a network 804, such as the Internet. Sensors 802 and web server 806 may communicate, in part or in whole, via wireless or hardwired communications, such as Ethernet, IEEE 802.11b wireless, or the like. Additionally, communication between sensors 802 and web server 806 may include various servers such as a mail server, mobile server, and the like.

Web server 806 may, as an example, be programmed to format data, accessed from local or remote databases or other sources of data, for comparison and presentation to users, in the format discussed in detail herein. Web server 806 may utilize various Web data interface techniques such as Common Gateway Interface (CGI) protocol and associated applications (or "scripts"), Java® "servlets", i.e., Java applications running on the Web server, or the like to present information and receive input from sensors 802. The web server 806, although described herein in the singular, may actually comprise plural computers, devices, backends, and the like, communicating (wired or wireless) and cooperating to perform the functions described herein.

Storage server 800 may further include storage logic 808 and time series database 810. In one example, storage logic 808 may organize, store, and retrieve time series data. Storage server 800 may further include time series database 810 to store time series data. Time series database 810 may be loaded with real time data or historical data (previously recorded data). It should be appreciated that time series database 810 may be located within storage server 800 or located remotely from server 800. If located remotely, storage server 800 may access time series database 810 through a network similar to network 804.

In one example, web server 806 may send data received from sensors 802 to storage logic 808. Storage logic 808 may then process the data and return the processed data back to web server 806. Web server 806 may then send the processed data to time series database 810 for storage.

Alternatively, in another example, storage logic 808 may instead be coupled to time series database 810 and operable to send the processed data directly to time series database 810. Storage logic 808 may also receive time series data from time series database 810 to process and send to web server 806 for transmission to client 812.

It will be recognized that the elements of FIG. 8 are shown as separate items for illustrative purposes only. In some examples, various features may be included in whole or in part with a common server device, server system or provider network (e.g., a common backend), or the like; conversely, individually shown devices may comprise multiple devices and be distributed over multiple locations. Further, various additional servers and devices may be included such as web servers, media servers, mail servers, mobile servers, and the like as will be appreciated by those of ordinary skill in the art.

Figure 9:
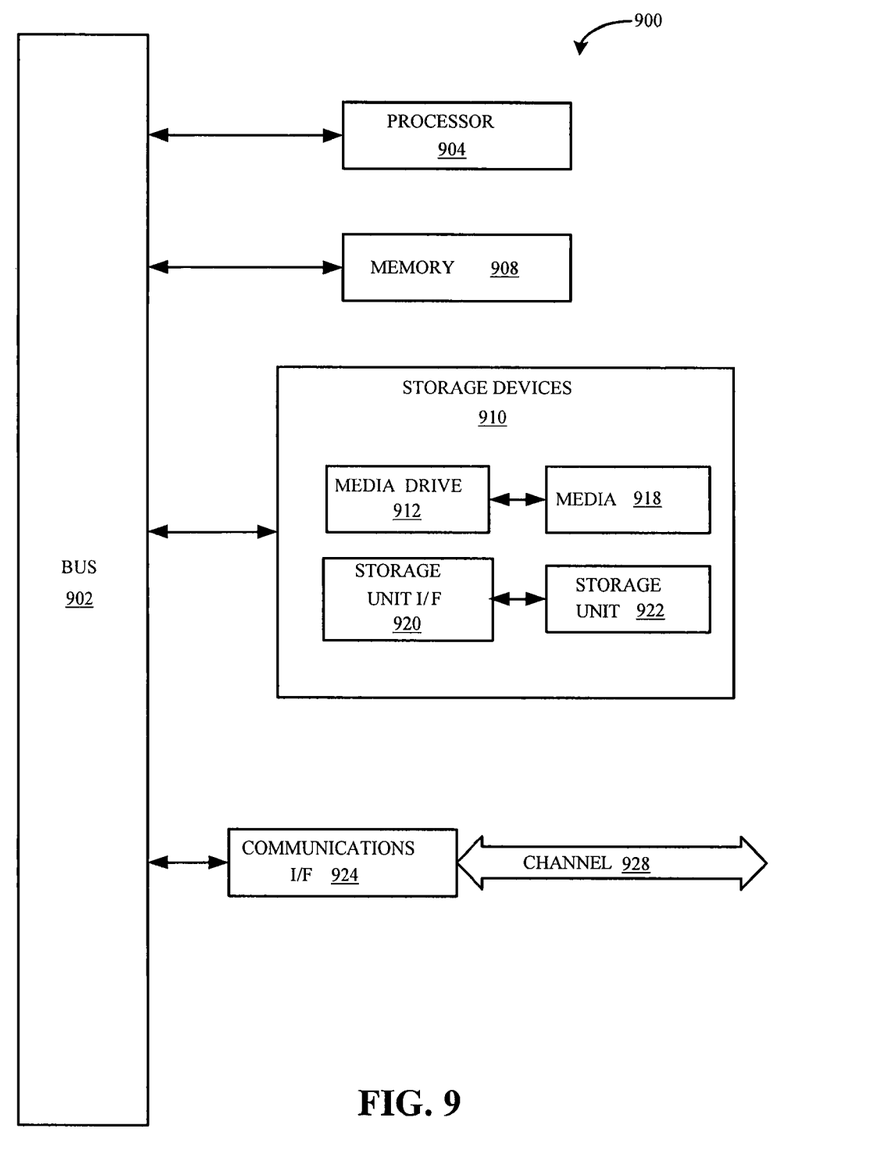
FIG. 9 illustrates a typical computing system that may be employed to implement some or all processing functionality in certain embodiments.

FIG. 9 illustrates an exemplary computing system 900 that may be employed to implement processing functionality for various aspects of the current technology (e.g., as a user/client device, media server, media capture server, media rules server, rules store, media asset library, activity data logic/database, combinations thereof, and the like.). Those skilled in the relevant art will also recognize how to implement the current technology using other computer systems or architectures. Computing system 900 may represent, for example, a user device such as a desktop, mobile phone, personal entertainment device, DVR, and so on, a mainframe, server, or any other type of special or general purpose computing device as may be desirable or appropriate for a given application or environment. Computing system 900 can include one or more processors, such as a processor 904. Processor 904 can be implemented using a general or special purpose processing engine such as, for example, a microprocessor, microcontroller or other control logic. In this example, processor 904 is connected to a bus 902 or other communication medium.

Computing system 900 can also include a main memory 908, such as random access memory (RAM) or other dynamic memory, for storing information and instructions to be executed by processor 904. Main memory 908 also may be used for storing temporary variables or other intermediate information during execution of instructions to be executed by processor 904. Computing system 900 may likewise include a read only memory ("ROM") or other static storage device coupled to bus 902 for storing static information and instructions for processor 904.

The computing system 900 may also include information storage mechanism 910, which may include, for example, a media drive 912 and a removable storage interface 920. The media drive 912 may include a drive or other mechanism to support fixed or removable storage media, such as a hard disk drive, a floppy disk drive, a magnetic tape drive, an optical disk drive, a CD or DVD drive (R or RW), or other removable or fixed media drive. Storage media 918 may include, for example, a hard disk, floppy disk, magnetic tape, optical disk, CD or DVD, or other fixed or removable medium that is read by and written to by media drive 914. As these examples illustrate, the storage media 918 may include a computer-readable storage medium having stored therein particular computer software or data.

In alternative embodiments, information storage mechanism 910 may include other similar instrumentalities for allowing computer programs or other instructions or data to be loaded into computing system 900. Such instrumentalities may include, for example, a removable storage unit 922 and an interface 920, such as a program cartridge and cartridge interface, a removable memory (for example, a flash memory or other removable memory module) and memory slot, and other removable storage units 922 and interfaces 920 that allow software and data to be transferred from the removable storage unit 918 to computing system 900.

Computing system 900 can also include a communications interface 924. Communications interface 924 can be used to allow software and data to be transferred between computing system 900 and external devices. Examples of communications interface 924 can include a modem, a network interface (such as an Ethernet or other NIC card), a communications port (such as for example, a USB port), a PCMCIA slot and card, etc. Software and data transferred via communications interface 924 are in the form of signals, which can be electronic, electromagnetic, optical, or other signals capable of being received by communications interface 924. These signals are provided to communications interface 924 via a channel 928. This channel 928 may carry signals and may be implemented using a wireless medium, wire or cable, fiber optics, or other communications medium. Some examples of a channel include a phone line, a cellular phone link, an RF link, a network interface, a local or wide area network, and other communications channels.

In this document, the terms "computer program product" and "computer-readable storage medium" may be used generally to refer to media such as, for example, memory 908, storage device 918, storage unit 922, or signal(s) on channel 928. These and other forms of computer-readable media may be involved in providing one or more sequences of one or more instructions to processor 904 for execution. Such instructions, generally referred to as "computer program code" (which may be grouped in the form of computer programs or other groupings), when executed, enable the computing system 900 to perform features or functions of embodiments of the current technology.

In an embodiment where the elements are implemented using software, the software may be stored in a computer-readable medium and loaded into computing system 900 using, for example, removable storage drive 914, drive 912 or communications interface 924. The control logic (in this example, software instructions or computer program code), when executed by the processor 904, causes the processor 904 to perform the functions of the technology as described herein.

It will be appreciated that, for clarity purposes, the above description has described embodiments with reference to different functional units and processors. However, it will be apparent that any suitable distribution of functionality between different functional units, processors or domains may be used. For example, functionality illustrated to be performed by separate processors or controllers may be performed by the same processor or controller. Hence, references to specific functional units are only to be seen as references to suitable means for providing the described functionality, rather than indicative of a strict logical or physical structure or organization.

Furthermore, although individually listed, a plurality of means, elements or method steps may be implemented by, for example, a single unit or processor. Additionally, although individual features may be included in different claims, these may possibly be advantageously combined, and the inclusion in different claims does not imply that a combination of features is not feasible or advantageous. Also, the inclusion of a feature in one category of claims does not imply a limitation to this category, but rather the feature may be equally applicable to other claim categories, as appropriate.

Although a feature may appear to be described in connection with a particular embodiment, one skilled in the art would recognize that various features of the described embodiments may be combined. Moreover, aspects described in connection with an embodiment may stand alone.

What is claimed is:

1. A method for storing a data series at multiple resolutions in a computer-readable data storage medium, wherein data of the data series are sequential data from a sensor, the method comprising:

receiving a plurality of time series data values;

storing first grouped time series data values in a first storage element in the computer-readable data storage medium, the first storage element corresponding to a first segment of time including the first grouped time series data values, wherein the first grouped time series data values are at a first resolution, the first resolution having a first duration;

storing second grouped time series data values in a second storage element in the computer-readable data storage medium, the second storage element corresponding to a second segment of time including the second grouped time series data values, wherein the second grouped time series data values are at the first resolution;

adding the first segment of time and the second segment of time to determine a third segment of time;

adding the first grouped time series data values and the second grouped time series data values to determine a data value representing the first and second grouped time series data values; and storing the data value representing the first and second grouped time series data values in a third storage element in the computer-readable data storage medium, the third storage element corresponding to the third segment of time, wherein the data value is at a second resolution, the second resolution being lower than the first resolution such that the second resolution has a second duration that is longer than the first duration.

2. The method according to claim 1, wherein the data value representing the first and second grouped time series data values is a sum of the first and second grouped time series data values.

3. The method according to claim 1, wherein the data value representing the first and second grouped time series data values is a largest value of the first and second grouped time series data values.

4. The method according to claim 1, wherein the data value representing the first and second grouped time series data values is an average value of the first and second grouped time series data values.

5. A system for storing a data series at multiple resolutions, wherein data of the data series are sequential data from a common source, the system comprising:

a sensor;

memory for storing program code, the program code comprising instructions for:

receiving a plurality of time series data values from the sensor;

storing first grouped time series data values in a first storage element in the computer-readable data storage medium, the first storage element corresponding to a first segment of time including the first grouped time series data values, wherein the first grouped time series data values are at a first resolution, the first resolution having a first duration;

storing second grouped time series data values in a second storage element in the computer-readable data storage medium, the second storage element corresponding to a second segment of time including the second grouped time series data values, wherein the second grouped time series data values are at the first resolution;

adding the first segment of time and the second segment of time to determine a third segment of time;

adding the first grouped time series data values and the second grouped time series data values to determine a data value representing the first and second grouped time series data values; and storing the data value representing the first and second grouped time series data values in a third storage element in the computer-readable data storage medium, the third storage element corresponding to the third segment of time, wherein the data value is at a second resolution, the second resolution being lower than the first resolution such that the second resolution has a second duration that is longer than the first duration; and a processor for executing the instructions stored in the memory.

6. The system according to claim 5, wherein the data value representing the first and second grouped time series data values is a sum of the first and second grouped time series data values.

7. The system according to claim 5, wherein the data value representing the first and second grouped time series data values is a largest value of the first and second grouped time series data values.

8. The system according to claim 5, wherein the data value representing the first and second grouped time series data values is an average value of the first and second grouped time series data values.

* * * * *